June 1, 1943. E. O. WHEATON 2,320,960
TRANSMISSION CONTROL
Filed Dec. 15, 1938 4 Sheets-Sheet 1
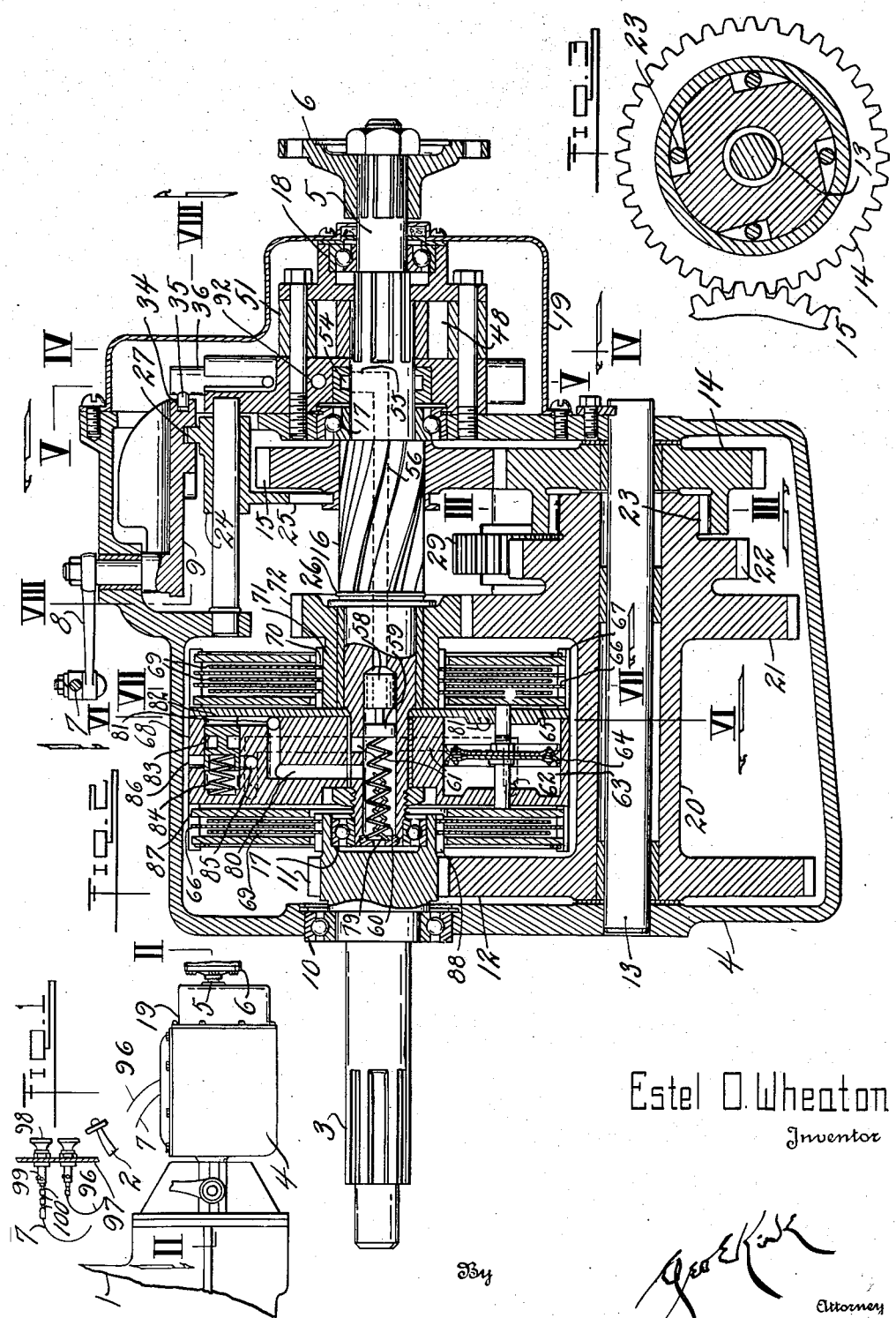
Estel O. Wheaton
Inventor

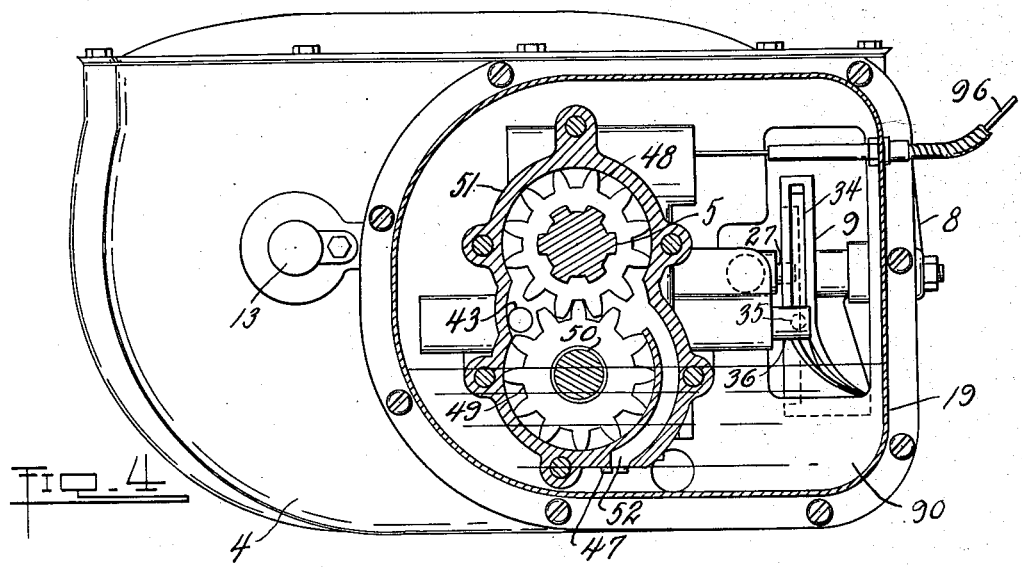
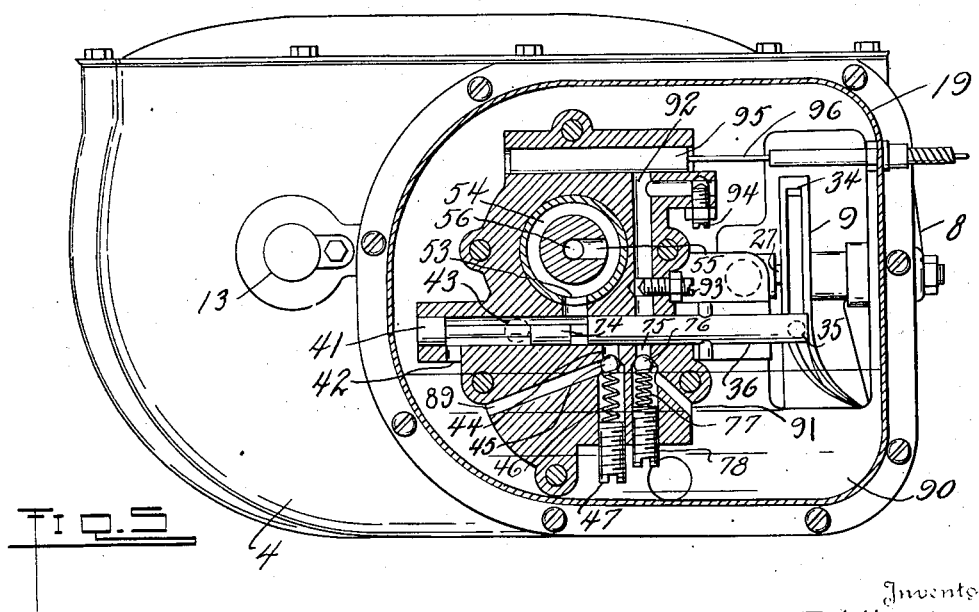

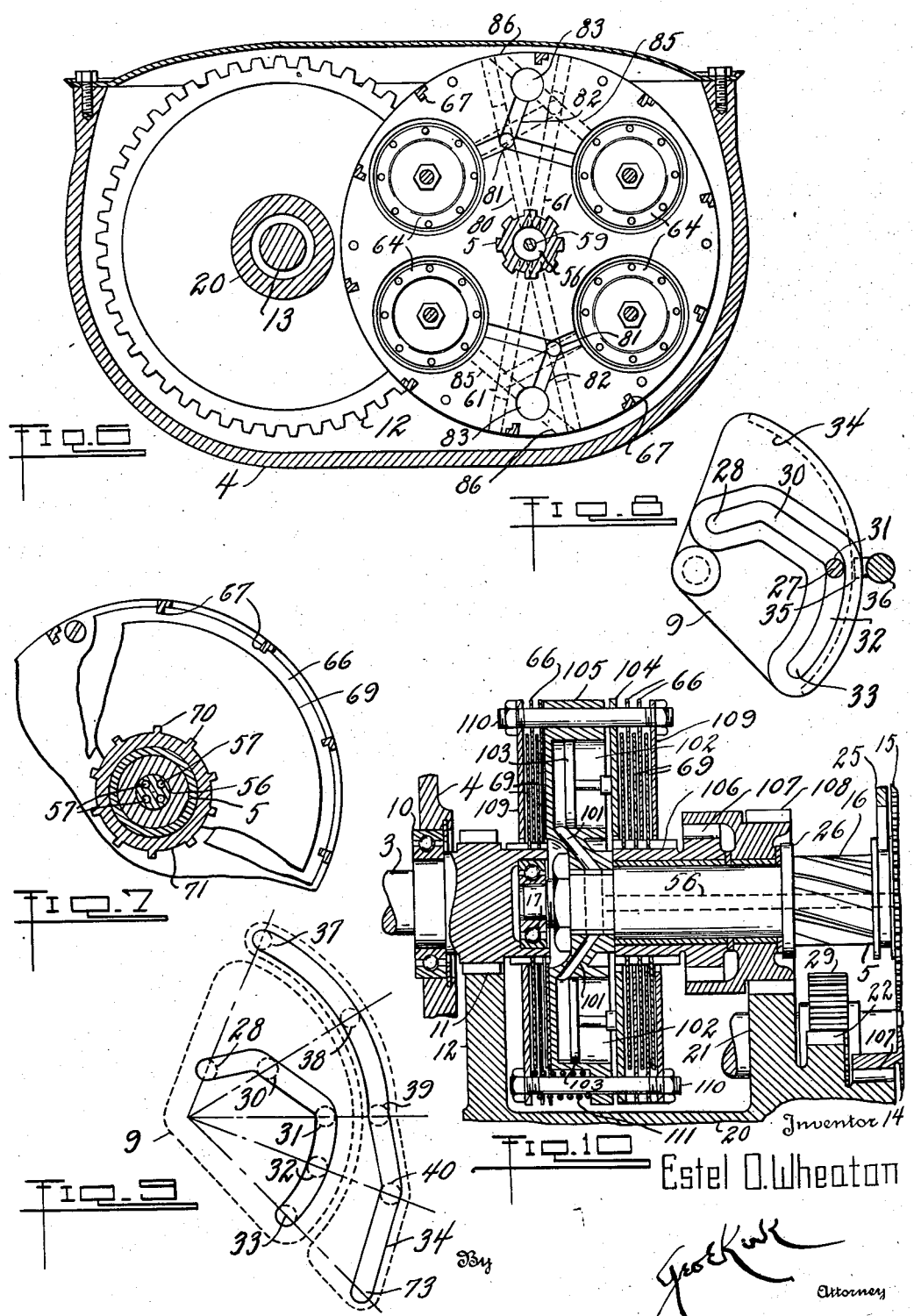

June 1, 1943.　　　E. O. WHEATON　　　2,320,960
TRANSMISSION CONTROL
Filed Dec. 15, 1938　　　4 Sheets-Sheet 4
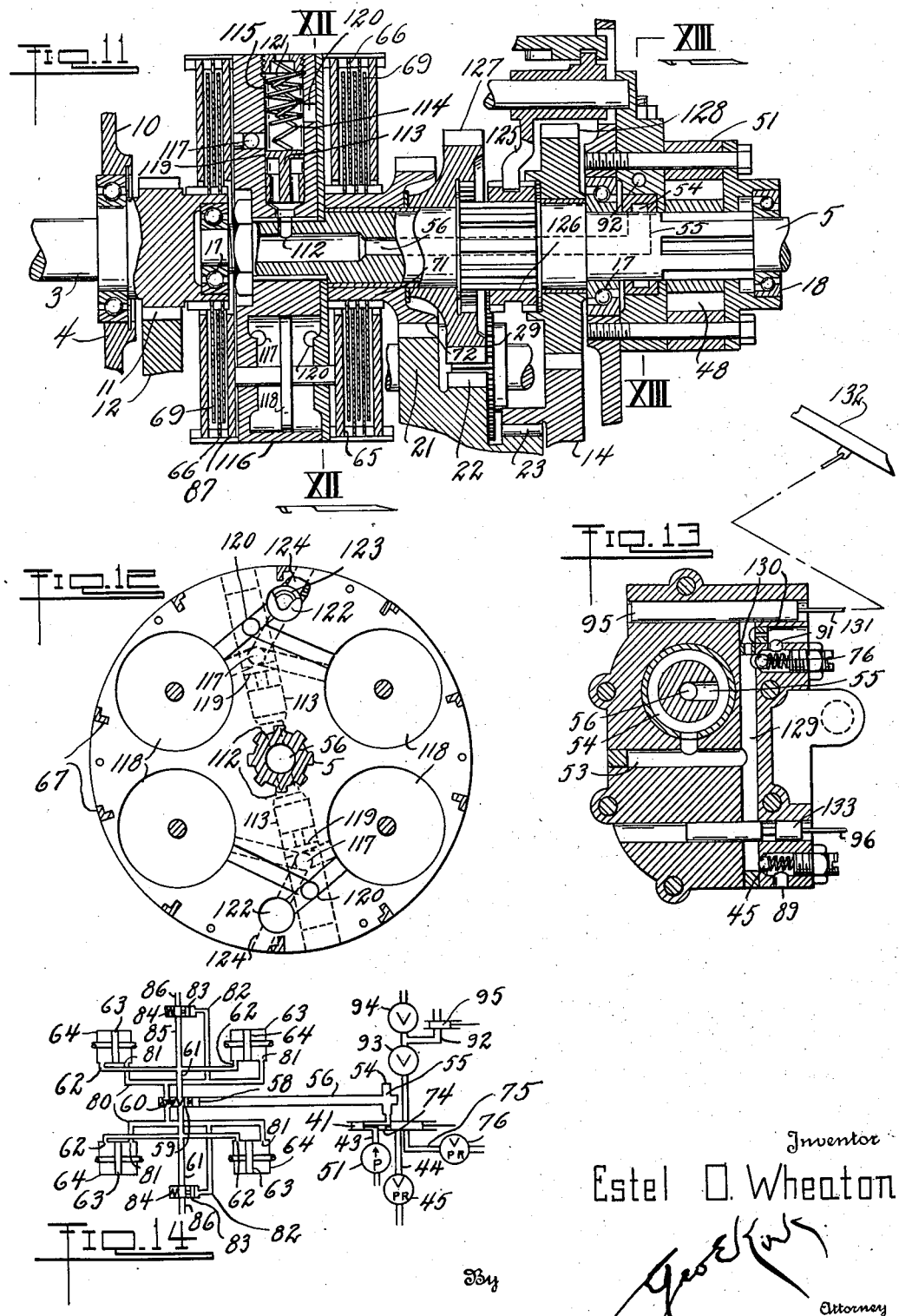
Inventor
Estel O. Wheaton
By
Attorney Patented June 1, 1943

2,320,960

UNITED STATES PATENT OFFICE 2,320,960

TRANSMISSION CONTROL

Estel O. Wheaton, Toledo, Ohio, assignor to Kelly-Wheaton Company, Toledo, Ohio, a corporation of Ohio Application December 15, 1938, Serial No. 245,835

18 Claims. (Cl. 74—336.5)

This invention relates to interconnection for speed changes between driving and driven shafts.

This invention has utility when incorporated in transmissions including a shiftable control and supplemental hydraulic control.

Referring to the drawings:

Fig. 1 is a side elevation, with parts broken away, of connection of the installation say to the internal combustion engine of a motor vehicle;

Fig. 2 is a section on the line II—II, Fig. 1, showing the change speed transmission features of the invention herein;

Fig. 3 is a section on the line III—III, Fig. 2, showing the overwind or disconnecting clutch effective when the device is thrown into intermediate speed or high;

Fig. 4 is a section on the line IV—IV, Fig. 2, showing the driven shaft actuated fluid pump for features of the control;

Fig. 5 is a section on the line V—V, Fig. 2, showing ducts and control features from the fluid pump of Fig. 4;

Fig. 6 is a section on the line VI—VI, Fig. 2, showing the control ducts to the piston and cylinder devices;

Fig. 7 is a section on the line VII—VII, Fig. 2, parts being broken away, showing features of the valve and disk clutch;

Fig. 8 is a view on the line VIII—VIII, Fig. 2, showing features of the cam for the shifting control;

Fig. 9 is a developed view showing features of the cam mechanical shifting control as well as the fluid control features thereof;

Fig. 10 is a view through the direct and intermediate speed fluid control features involving a single direction of operation for the pistons and cylinders device instead of reversely operating as in Fig. 2;

Fig. 11 is a sectional view through the transmission, wherein the valves for the pistons and cylinders device are disposed radially instead of axially with the driving shaft, there being also shown shiftable jaw clutch instead of shiftable gear and there being feature of fluid pump controls omitting the adjustable discharge port feature of Fig. 5;

Fig. 12 is a section on the line XII—XII, Fig. 11, showing the ports to the pistons and cylinders device and the valves as departing from the showing in Fig. 6;

Fig. 13 is a section on the line XIII—XIII, Fig. 11, showing the fluid duct as departing from the showing in Fig. 5; and Fig. 14 is a diagrammatic showing of the fluid controls.

Internal combustion engine 1 (Fig. 1) is shown with clutch pedal 2 for operating a clutch at a fly-wheel, thereby to connect and disconnect the engine 1 from main driving shaft 3 in transmission housing 4. From the housing 4 extends driven shaft 5 having connecting flange 6 adapted to be attached to a propeller shaft. Manual control 7 extends to arm 8 effective to shift cam plate 9.

The housing 4 (Fig. 2) has bearing 10 for the drive shaft 3. Within this housing 4 is pinion 11 in mesh with gear 12 loose on intermediate shaft 13 parallel to the shaft 3. This intermediate shaft 13 has loosely thereon gear 14 in mesh with gear 15 on helical spline 16 of the driven shaft 5. This driven shaft 5 is mounted in bearing 17 in the housing 2 aligned with the bearing 10. There is additional bearing 18 in supplemental housing section 19 for this driven shaft 5. The gear 12 has sleeve extension 20 along the shaft 13. This sleeve extension 20 carries intermediate gear 21, reverse connecting gear 22, and has one way or overrunning clutch 23 disconnecting from the first speed gear 14 as the intermediate speed becomes effective. The cam 9 is effective to control sleeve 24 handling fork 25 to shift the gear 15 to the extreme position to the left of Fig. 2 as to the splines 16 for positioning of this gear 15 adjacent collar 26. Projection 27 from the sleeve 24 is at position 28 of the cam 9 (Fig. 8), and this gear 15 is in mesh with second intermediate shaft gear 29 effective from mesh relation with the gear 22 to actuate the driven shaft 5 in reverse direction. Further movement of the mechanical control 7 in shifting the cam 9 is effective to position 30 (Fig. 8), thereby locating the gear 15 in clearway between the gears 22 and the gear 14 for neutral or non-driving relation.

Further actuation of the control 7 in this same direction acts upon the sleeve 24 in causing the projection 27 to ride from the station 30 to station 31, which is effective to shift the gear 15 on the driven shaft 5 into mesh with the pinion 14 to have such effective at say first speed forward in being actuated from the gear 12 through the clutch 23. Any further shift of the control 7 to actuate the cam 9 causes the pin 27 to locate at stations 32, 33, with no shifting of the gear 15 from its first speed forward position.

It is to be noted (Fig. 9) that the mechanical control shiftings effective in positioning the gear 15 through the stations 28, 30, 31, are shiftings simultaneously effective through cam face way 34 (Figs. 2, 5) acting on pin 35 with no shifting of plunger 36. It is thus noted that the cam way 34 has station 37 at reverse, 38 at neutral, 39 at first speed forward, with no actuation for the plunger 36. However, as the control 7 is shifted further in this general direction, station 40 is effective to shift the plunger 36 thereby to cause plunger portion 41 to close spill port 42 from the pressure fluid supply duct 43 from the pump and simultaneously open spill port 44 having ball valve 45 held to its seat by helical compression spring 46 as adjusted by plug 47. There is thus accumulated a pressure control for build up.

The driven shaft 5 (Fig. 4) has thereon rotary gear element 48 in mesh with gear element 49 on parallel shaft 50 in pump housing 51 enclosed by the housing 19. This housing 51 has suction intake way 52 for delivery of the fluid as oil by this pump to discharge port 43. As this pressure builds up in the region controlled by the plunger 36, flow of pressure fluid from the pump, as coming thereto by the duct 43, may be by branch 53 (Fig. 5) to ring chamber 54 in communication by radial duct 55 with axial duct 56 in the driven shaft 5. This pressure along the axial duct 56 (Figs. 2, 7) may be through ports 57 of head 58 to valve 59. This pressure is effective to overcome the resistance of spring 60 and thereby shift the valve 59 to open port 61 having discharge outlet 62 in the several cylinders 63 to actuate pistons 64, thereby effective through plate 65 to act on disks 66 having keys 67 with cylinder housing member 68. These disks 66 are thus brought in clutch relation with intermediate disks 69 having splined connections 70 with sleeve 71 to pinion 72. In this intermediate speed connection, the gear 21 in mesh with the gear 72 is effective through this housing 68 keyed to the driven shaft 5 to actuate this driven shaft 5 at the intermediate speed from the prime mover or gas engine 1.

In the event the control 7 is shifted to locate the pin 35 at station 73 (Fig. 9) the plunger 36 has portion 74 (Fig. 5) close the port 44 and open port 75, wherein ball valve 76 is held by compression helical spring 77 as adjusted by screw plunger 78. This is desirably at a higher pressure or different pressure than the adjustment for holding the ball 45 seated. This means that the flow into the axial duct 56 may be so effective on the valve 58 (Fig. 2) as to overcome additional spring 79 as well as the spring 60. Head portion 58 thereby is effective to close the duct 61 and the valve 59 opens the duct 80 having communication to outlet 81 on the opposite side of the piston 64 from that as for second speed. The head portion 58 having closed the duct portion 61, the build up of pressure in the duct 80 is effective through duct 82 to act on pistons 83 against the resistance of springs 84 and thereby through ducts 85 allow spill at ports 86 out into the housing 4 from the side of the pistons 64 into which the outlet 62 extends. This build up of pressure on the opposite side of the piston 64 effects a release of the second speed disk clutch 66, 69, and causes control plate 87 to act on disks 66 keyed with the housing 68 to connect up with disks 69 keyed through spline 88 for direct connection of the driving shaft 3 through this disk clutch and the housing 68 with the driven shaft 5.

Inasmuch as the driven shaft 5 is rotating, the fluid pump 48, 49, continues supply, and at the overcoming of positioning of the ball seat 45 at second speed, there is spill by port 89 (Fig. 5) into sump 90 or oil chamber in the housing 19. With the position for high speed so that the ball 45 may be not unseated but the ball 76 act for relief, the spill is then by port 91 into this sump 90. The extent of the build up of these pressures is further determined by spill duct 92 having adjustable stem 93 for main control and adjustment 94 as an ultimate control independent of plunger 95 connected to control 96, which may extend to convenient position for the driver of the vehicle. At this control of the plunger 95 to cut out the adjustment or congestion as effected by the device 95, the spill through duct 92 may be such that the build up from the hydraulic pump may be insufficient to hold the connection into high or direct speed forward and thus allow the functioning of this device automatically for dropping into second speed or even back to first speed forward, and automatically recover.

The positions for the control 7 may be at dash 97 (Fig. 1) with control device 98 having spring actuated ball stop 99 to register with various stations 100 corresponding to the positions on the cam 9. There is thus a guiding factor in control for the operator as to the position of this device 98.

Duct 56 in the driven shaft 5 (Fig. 10) is shown extending to radial ducts 101 directly in communication with cylinders 102 to act on series of pistons 103, thereby to thrust plate 104 to act on disk clutch members 66, 69, in connecting housing 105 as keyed to the driven shaft 5 with sleeve 106 having overrunning clutch 107 connection with gear 108 in mesh with the intermediate gear 21. For direction connection, as the build up of pressure is from station 40 to station 73, this increased pressure through the duct 56 and the radial ducts 101 into the cylinders 102 effects a further shifting of the plate 104, to shift on plates 109 connected by bolts 110 against the resistance of springs 111, in thereby causing clutch disks 66, 69, to connect this housing 105 directly with the driving shaft 3. The overrunning clutch 107 permits this connection to be effective in operating the driven shaft 5.

Axial duct 56 (Fig. 11) is shown in communication with radial ducts 112 to operate pistons 113 against compression helical springs 114, seated in radial cylinders 115 in general housing 116 keyed with the driven shaft 5. This build up of pressure at the lower or second speed permits flow from the duct 112 through ducts 117 to act on pistons 118 and thereby shift the plate 65 to effect clutching of the driven shaft with the sleeve 71 fixed with the gear 72 in mesh with intermediate gear 21, thereby effecting second speed forward. Further build up of pressure shifts head 119, fixed with the plunger 113, to close off the duct 117 and open duct 120, thereby causing the pistons 118 to act on the plate 87 in operating disk clutch 66, 69, for direct connection of the drive shaft 3 with the driven shaft 5. This increase in pressure for the high speed in the travel of the plunger 113 is against the resistance of compression helical spring 121 as in addition to the spring 115. This increased pressure in the duct 120 acts on plunger 122 against the resistance of spring 123 and thereby opens port 124 for spill flow from the second speed side of the piston 118 to thus release the direct connection or high speed for function, similar to the release effected by the pistons 83 (Figs. 2, 8).

In lieu of control fork 25 (Fig. 2) there is supplied in Fig. 11 control fork 125 acting on jaw clutch 126 to shift such from reverse effecting gear pinion 127 in one direction to first speed pinion 128 in the reverse direction, there being an intermediate, neutral, or idle position.

In lieu of the manually adjustable or pre-set spill-way controls 93, 94, from the pump of this hydraulic device, there may be in duct 129 spill restricting plugs 130 as the flow-off control (Fig. 13).

In the operation hereunder, the driver of the vehicle may have the manual control fully for interconnection and furthermore limit the extent to even cut out hydraulic control providing there is in the manual control set for just first speed forward. In the setting of the control beyond the first speed forward, the mechanically actuated shifter in the connection between reverse, neutral, and first speed ahead, due to the driving connection for the hydraulic pump 48, 49, is effective to build up a pressure in the system of the transmission. At the second speed forward position, the control device 98 in locating the cam in the mechanical stations 32 does not affect any different or other shifting mechanically than the first speed forward. However, the supplemental cam at station 40 (Fig. 9) does affect the pressure control action of this hydraulic pump so that this pressure is transmitted through the hydraulic clutch device to connect the intermediate gear for driving relation effective only as the pressure is built up. There is thus avoided occasion to stall the motor in this operation.

In the event the positioning of the control 98 be at station 33, it does not shift the gear 15 from the position at first or second speed but does shift the plunger 36 as controlled by the station 73. This means there is further build up of pressure in the hydraulic clutch scheme herein disclosed not only to release the hydraulic connection for the second speed but to cut in this connection for the direct connection or high speed forward. It is thus seen that in these interconnections as automatically effected in all the build up beyond first speed forward such is within the control of the operator through the device 98, but as adjusted for high speed forward such has an automatic sequence in the hydraulic clutch connections effective through the stages for the build up, and automatically accommodating such in the check back instances wherein the speed may be slowed down so that the pump is not functioning sufficiently to maintain the pressure for holding in the hydraulic clutch. This is a simplified device with features of mechanical and hydraulic inter-working controls, simplified and compact in assembly for efficient operation.

The fully automatic or hydraulic control interconnection is normally at station 73 for high and modified by the speed of the driven shaft. A variant therefrom involves omission of the control cam as to the hydraulic features, and in such instance plunger 95 (Fig. 13) may have connection 131 to accelerator pedal 132. The additional dash control 96, instead of being to plunger 36, is to plunger 133 effective as a manual control for cutting out over pressure release valve 45 by way of port 89. This means a building up of pressure in the duct 129 for the adjustable release, say from second speed as effected at ball valve 76 and spill by way of the duct 91.

This application is a continuation-in-part of the subject-matter of applicant's Patent No. 2,181,647, November 28, 1939, Transmission control.

What is claimed and it is desired to secure by United States Letters Patent is:

1. A transmission embodying a driving shaft, a driven shaft, gearing therebetween including an intermediate shaft parallel to the driven shaft, a shiftable control to affect transmission connection from the intermediate shaft, a hydraulic control thereby to affect functioning change in transmission connection between the driving and driven shafts by varying the interconnection relation of said gearing, a clutch device functioning in response to said hydraulic control manually controllable means for modifying the hydraulic control, and a driven shaft responsive fluid supply for the hydraulic control, there being a duct axially of the driven shaft providing communication between the supply and the hydraulic control.

2. A transmission embodying a driving shaft, a driven shaft, gearing therebetween including an intermediate shaft parallel to the driven shaft, a shiftable control to affect transmission connection from the intermediate shaft, a multi-stage hydraulic control to affect functioning change in transmission connection between the driving and driven shafts by varying the interconnection relation of said gearing, a multi-stage clutch device functioning in response to said hydraulic control, a driven shaft responsive fluid supply for the hydraulic control, said hydraulic control having pressure responsive means for selecting the different stages, a cam for determining the position of the shiftable control, an additional cam for determining the functioning of the pressure responsive means, and an actuator for simultaneously shifting the cams.

3. A transmission embodying a driving shaft, a driven shaft, gearing therebetween including an intermediate shaft parallel to the driven shaft, a shiftable control to affect transmission connection from the intermediate shaft, a multi-stage hydraulic control to affect functioning change in transmission connection between the driving and driven shafts by varying the interconnection relation of said gearing, a multi-stage clutch device functioning in response to said hydraulic control, a driven shaft responsive fluid supply for the hydraulic control, said hydraulic control having pressure responsive means for selecting the different stages, a cam for determining the positions of the shiftable control for direct and neutral, an additional cam for determining the functioning of the pressure responsive means including additional speeds, and a common actuator for simultaneously shifting the cams.

4. A transmission embodying a driving shaft, a driven shaft, variable speed gears therebetween including overrunning means for one of said gears, shiftable means to affect transmission engagement in different driving connections, a driven shaft responsive fluid supply, a hydraulic distributive system for the fluid supply including a fluid pressure responsive distributive valve for the fluid, a multi-stage clutch device actuated by the fluid supply for connecting the shafts in different driving relationships including direct drive connection, a fluid pressure relief valve to vary the engagement of the clutch stages and thereby automatically change the speed relationship between the driving and driven shafts, and a fluid control valve for the fluid supply for limiting the automatic operation of the said multi-stage clutch device.

5. A transmission embodying a driving shaft, a driven shaft, variable speed gears therebetween including overrunning means for one of said gears, shiftable means to affect transmission engagement in different driving connections, a driven shaft responsive fluid supply, a hydraulic distributive system for the fluid supply including a fluid pressure responsive distributive valve for the fluid, a multi-stage clutch device actuated by the fluid supply for connecting the shafts in different driving relationships including direct drive connection, a fluid pressure relief valve to vary the engagement of the clutch stages and thereby automatically change the speed relationship between the driving and driven shafts, a fluid control valve for the fluid supply for limiting the automatic operation of the multi-stage clutch device, and a manual control connected to both the shiftable means and the control valve, there being a range of settings for the control valve independently of the shiftable means.

6. A transmission embodying a driving shaft, a driven shaft, variable speed gears therebetween including overrunning means for one of said gears, shiftable means to affect transmission engagement in different driving connections, a driven shaft responsive fluid supply, a hydraulic distributive system for the fluid supply including a fluid pressure responsive distributive valve for the fluid, a multi-stage clutch device actuated by the fluid supply for connecting the shafts in different driving relationships including direct drive connection, a fluid pressure relief valve to vary the engagement of the clutch stages and thereby automatically change the speed relationship between the driving and driven shafts, a fluid control valve for the fluid supply for limiting the automatic operation of the multi-stage clutch device, a manual control connected to both the shiftable means and the control valve having a range of settings for the control valve independently of the shiftable means, and a manually operable supplemental control valve for the fluid supply to affect the interconnection of the driving and driven shafts.

7. In a transmission, a driving shaft, a driven shaft, multi-speed gears therebetween including overrunning means for one of said gears, a shiftable control to affect transmission engagement for forward or reverse rotation of the driven shaft, a driven shaft responsive fluid supply, a hydraulic duct system for distributing the said fluid supply including a fluid pressure responsive distributive valve, a multi-stage clutch device actuated by the said driven shaft responsive fluid supply for connecting the driving and driven shafts in different speed ratios including direct drive connection, and means responsive to the fluid supply pressure for automatically disengaging one of the clutch stages to permit engagement of another clutch stage and thereby vary the speed ratio between the said driving and driven shafts.

8. In a transmission, a driving shaft, a driven shaft, multi-speed gears therebetween including overrunning means for one of said gears, a shiftable control to affect transmission engagement for forward or reverse rotation of the driven shaft, a driven shaft responsive fluid supply, a hydraulic duct system for distributing the fluid supply including a fluid pressure responsive distributive valve, a multi-stage clutch device actuated by the driven shaft responsive fluid supply for connecting the driving and driven shafts in different speed ratios including direct drive connection, means responsive to the fluid supply pressure for automatically disengaging one of the clutch stages to permit engagement of another clutch stage and thereby vary the speed ratio between the driving and driven shafts, and a manually operable control valve for the fluid system to limit the automatic operation of the multi-stage clutch device.

9. In a transmission, a driving shaft, a driven shaft, multi-speed gears therebetween including overrunning means for one of said gears, a shiftable control to affect transmission engagement for forward or reverse rotation of the driven shaft, a driven shaft responsive fluid supply, a hydraulic duct system for distributing the fluid supply including a fluid pressure responsive distributive valve, a multi-stage clutch device actuated by the driven shaft responsive fluid supply for connecting the driving and driven shafts in different speed ratios including direct drive connections, means responsive to the fluid supply pressure for automatically disengaging one of the clutch stages to permit engagement of another clutch stage and thereby vary the speed ratio between the driving and driven shafts, a control valve for the fluid system to limit the automatic operation of the multi-stage clutch device, and a manual control means connected with both the shiftable control and the control valve having an independent range of settings for each.

10. In a transmission, a driving shaft, a driven shaft, multi-speed gears therebetween including overrunning means for one of said gears, a shiftable control to affect transmission engagement for forward or reverse rotation of the driven shaft, a driven shaft responsive fluid supply, a hydraulic duct system for distributing the fluid supply including a fluid pressure responsive distributive valve, a multi-stage clutch device actuated by the driven shaft responsive fluid supply for connecting the driving and driven shafts in different speed ratios including direct drive connection, means responsive to the fluid supply pressure for automatically disengaging one of the clutch stages to permit engagement of a different clutch stage and thereby vary the speed ratio between the driving and driven shafts, a control valve for the fluid system to limit the automatic operation of the multi-stage clutch, a manual control means connected with both the shiftable control and the control valve having an independent range of settings for each, and a manually operable supplemental control valve for the fluid supply to affect the interconnection of the driving and driven shafts.

11. A transmission embodying a driving shaft, a driven shaft, change speed gears therebetween including overrunning means for one of said gears, a shiftable control to affect transmission connection for forward or reverse rotation of the driven shaft, hydraulically actuated clutch means for connecting the shafts in different speeds including a direct drive connection between the shafts, a driven shaft responsive fluid supply to actuate said hydraulic clutch means, a hydraulic distributive system including fluid pressure responsive valve means for automatically distributing said fluid supply to said clutch means, a control valve for the hydraulic distributive system, and a manual control device connected with both the shiftable control and the control valve, there being a range of settings for the manual control for positioning the shiftable control independently of the said control valve.

12. A transmission embodying a driving shaft, a driven shaft, variable speed gears therebetween, shaft means for the variable speed gears extending in the common direction of said shafts, a shiftable control to connect certain of said gears in different driving relationships, a driven shaft responsive fluid supply, a hydraulic distributive system for said fluid supply including a control valve, a multi-stage clutch device actuated by the fluid supply for connecting the shafts in different speeds including a direct drive connection, and a manual control connected with both the shiftable control and the control valve, there being a range of settings for positioning the shiftable control and the control valve so that the driven shaft responsive fluid supply is effective to actuate the multi-stage clutch device and automatically connect the driving and driven shafts in a plurality of different speeds.

13. A transmission embodying a driving shaft, a driven shaft, change speed gears therebetween including overrunning means for one of said gears a shiftable control to affect transmission connection for forward or reverse rotation of the driven shaft, hydraulically actuated clutch means for connecting the shafts in different speeds including direct drive connection between the shafts, driven shaft responsive fluid supply to actuate said hydraulic clutch means, a hydraulic distributive system including fluid pressure responsive valve means for automatically distributing said fluid supply to said clutch means, a control valve for the hydraulic distributive system, a manual control device connected with both the shiftable control and the control valve, there being a range of settings for the manual control for positioning the control valve independently of the shiftable control so that the driven shaft responsive fluid supply is effective to connect automatically the said driving and driven shafts in a plurality of different driving relationships.

14. A transmission embodying a driving shaft, a driven shaft, variable speed gears therebetween, shaft means for the variable speed gears extending in the common direction of said shafts, a shiftable control to connect certain of said gears in different driving relationships, a driven shaft responsive fluid supply, a hydraulic distributive system for said fluid supply including a control valve, a multi-stage clutch device actuated by the fluid supply for connecting the shafts in different speeds including direct drive connection, there being a range of independent settings for both the shiftable control and the control valve, whereby manual setting of the control valve will affect automatic functioning change in transmission connection between the driving and driven shafts.

15. A transmission embodying a driving shaft, a driven shaft, change speed gearing therebetween including overrunning means for one of said gears, a shiftable control to affect transmission connection for forward or reverse rotation of the driven shaft, hydraulically actuated clutch means for connecting the shafts in different speeds including direct drive connection between the shafts, a driven shaft responsive fluid supply to actuate said hydraulic clutch means, a hydraulic distributive system including fluid pressure responsive valve means for automatically distributing said fluid supply to said clutch means, a control valve for the hydraulic distributive system, a manual control device connected with both the shiftable control and the control valve, there being a range of settings for the manual control for positioning the control valve independently of the said shiftable control so that the driven shaft responsive fluid supply is effective to connect automatically the driving and driven shafts in a plurality of different driving relationships, and a manually operable supplemental control valve for the hydraulic distributive system to affect the automatic interconnection of the driving and driven shafts.

16. A transmission embodying a driving shaft, a driven shaft, variable speed gears therebetween, shaft means for the variable speed gears extending in the common direction of said shafts, a shiftable control to connect certain of said gears in different driving relationships, a driven shaft responsive fluid supply, a hydraulic distributive system for said fluid supply including a control valve, a multi-stage clutch device actuated by the said fluid supply for connecting the shafts in different speeds including direct drive connection, a manual control connected with both the shiftable control and the control valve having a range of settings for positioning the shiftable control and the control valve so that the driven shaft responsive fluid supply is effective to actuate the clutch device and automatically connect the driving and driven shafts in a plurality of different speed ratios, and a manually operable supplemental control valve for the hydraulic distributive system to affect the automatic interconnection of the driving and driven shafts.

17. A transmission embodying a driving shaft, a driven shaft, change speed gears therebetween including overrunning means for one of said gears, a shiftable control to effect transmission connection for forward or reverse rotation of the driven shaft, hydraulically actuated clutch means for connecting the shafts in different speeds including direct drive connection between the shafts, driven shaft responsive fluid supply to actuate said hydraulic clutch means, a hydraulic distributive system including fluid pressure responsive valve means for automatically distributing said fluid supply to said clutch means, a control valve for the hydraulic distributive system, a manual control device connected with both the shiftable control and the control valve, there being a range of settings for the manual control for positioning the control valve independently of the said shiftable control so that the automatic connection of the driving and driven shafts is limited to a predetermined driving relationship.

18. A transmission embodying a driving shaft, a driven shaft, gearing therebetween including an intermediate shaft parallel to the driven shaft, a shiftable control in itself operable to affect transmission connection from the intermediate shaft, a hydraulic actuator to affect change in transmission from the driving and driven shafts as to said gearing, a clutch device in transmission series with the transmission connection and functioning in response to said hydraulic actuator therefor, a driven shaft responsive liquid supply of prime mover energy for the functioning of the hydraulic actuator, and manually controllable means for modifying the functioning of the hydraulic actuator.

ESTEL O. WHEATON.